United States Patent Office
3,527,815
Patented Sept. 8, 1970

3,527,815
OLEFINIC ALCOHOLS
Hans D. Holtz, Bartlesville, Okla., assignor to Phillips Petroleum Company, a corporation of Delaware
No Drawing. Filed Nov. 8, 1965, Ser. No. 506,866
Int. Cl. C07c 35/00, 69/54
U.S. Cl. 260—617
6 Claims

ABSTRACT OF THE DISCLOSURE

Unsaturated alcohols such as 1,2-bis(2-hydroxy-3-cyclohexen-1-yl)ethylene are produced by the oxidation of a triolefin in the presence of a boron-containing compound, followed by hydrolysis of the resulting olefinic boarate esters.

This invention relates to the production of novel unsaturated organic compounds. In one aspect it is concerned with a process for producing novel olefinic borate esters and alcohols.

In a copending application of D. L. Crain (Ser. No. 502,544 filed Oct. 22, 1965) now abandoned, and its continuation-in-part application Ser. No. 665,239 filed Sept. 5, 1967, now U.S. Pat. 3,463,828 issued Aug. 26, 1969 assigned to a common assignee, namely, Phillips Petroleum Company of Bartlesville, Oklahoma, there is described the preparation of novel triolefin compounds.

These novel triolefin compounds can be prepared by contacting an alkenyl-substituted cycloalkene with an alumina-supported molybdenum or tungsten catalyst at a temperature ranging from 25–300° C. and under a pressure ranging from 0–1500 p.s.i.g. Above-identified U.S. Pat. 3,463,828 contains a disclosure of preparing these novel triolefin compounds in greater detail.

Accordingly, it is an object of this invention to provide a process for oxidizing the novel triolefin compounds in the presence of boric acid to borate esters, which can be hydrolyzed to the corresponding alcohols.

It is another object of this invention to provide novel borates of hydroxy-substituted 1,2 - bis(3-cyclohexen-1-yl)ethylene and alcohols therefrom.

It is yet another object of this invention to provide novel unsaturated mono-ol and diol derivatives of 1,2-bis(3-cyclohexen-1-yl)ethylenes.

Other objects and many of the attendant advantages of this invention will be readily appreciated as the same becomes better understood by reference to the following detailed description.

In general, the present invention provides a method for producing at least one unsaturated alcohol having a formula selected from the group consisting of

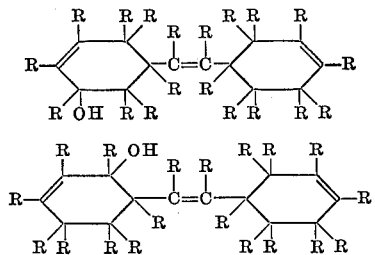

and

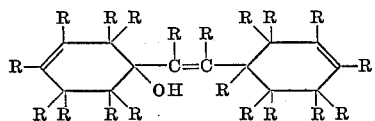

by oxidation of a triolefin having the formula

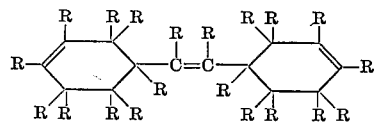

with an oxygen-containing gas in the presence of a boron-containing compound selected from the group consisting of orthoboric acid and dehydration products thereof, followed by subsequent hydrolysis of the resulting borate ester wherein R in the above-identified formulae is selected from at least one member of the group consisting of hydrogen, methyl and ethyl with at least one of said R groups, which is in a position allylic to an olefinic double bond, being hydrogen and with the total number of carbon atoms in all of said R groups preferably being not greater than 8. The unsaturated alcohol is readily hydrogenated to the corresponding saturated alcohol. In those situations wherein the triolefins employed as the starting material have at least one hydrogen atom in each of two or more positions allylic to an olefinic double bond, hydrolysis of the oxidation product produces unsaturated diols in addition to unsaturated mono-ols. These unsaturated diols can be hydrogenated, e.g., in the presence of a suitable palladium catalyst, to the corresponding saturated diols.

Specific examples of triolefins useful as starting materials in the practice of this invention are as follows:

1,2-bis(3-cyclohexen-1-yl)ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2-bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene
1-(3-cyclohexen-1-yl)-2-(2-methyl-3-cyclohexen-1-yl)ethylene The boron-containing compounds can be orthoboric acid or any of its dehydration products. Suitable examples are orthoboric acid, metaboric acid, tetraboric acid or boron oxide. Throughout the present specification and claims the term "boric acid" is meant to include each of these designated compounds.

The boric acid compounds preferably should be used in amounts to provide at least one atom of boron for every three hydroxyl groups desired as substituents on the triolefin molecules. When the triolefin has a hydrogen atom in at least two positions allylic to an olefinic double bond, oxidation in each of these positions can occur. Therefore, it is generally desirable that the oxidation be terminated when not more than about 30 percent of the triolefin has been oxidized to obtain maximum selectivity to borate esters from which mono-ols can be produced.

The oxygen-containing gas can be pure oxygen. However, it is desirable that the oxygen-containing gas be not more than 50 mol percent oxygen. Preferably, the oxygen-containing gas should contain about 1–10 mol percent oxygen. Although any inert gaseous diluent can be used, nitrogen is the diluent of choice. Air diluted with nitrogen is an economical oxygen-containing gas. The rate of introduction of the oxygen can vary over a wide range, for erample, 0.4–50 liters per hour, based on the oxygen content, per mol of triolefin, preferably with good dispersion through stirring or other means of agitation.

Although the temperature at which the oxidation is carried out can be varied over a wide range, the temperature will usually be within the range of about 20–200 C., generally being within the range of about 80–150 C. Although the higher temperatures provide a faster rate of reaction, the lower temperatures result in greater selectivity to borate esters from which mono-ols can be produced. The reaction time usually will be within the range of about 10 minutes to about 24 hours, generally being within the range of about 1 hour to about 6 hours. If desired, a solvent, e.g., benzene, inert under the reaction conditions, can be used. The reaction pressure need be only sufficient to maintain the triolefin and/or solvent in substantially the liquid phase.

This invention provides a method for producing at least one borate ester having the formula $R'OB(OR'')_2$, where $R'$ is a monovalent hydrocarbyl radical selected from the group consisting of

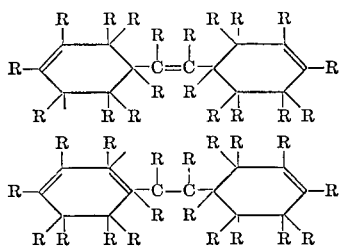

and

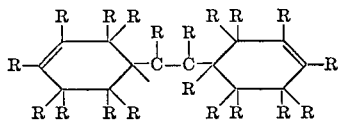

and $R''$ is at least one member selected from the group consisting of hydrogen and $R'$, wherein R in the above formulas is at least one member selected from the group consisting of hydrogen and methyl and ethyl radicals, the total number of carbon atoms in all of said R groups in each of said $R'$ radicals preferably being not greater than 8.

Examples of some borate esters which can be produced by the process of this invention include the following:

tris(5-[2-(3-cyclohexen-1-yl)vinyl]-2-cyclohexen-1-yl) borate
bis(5-[2-(3-cyclohexen-1-yl)vinyl]-2-cyclohexen-1-yl) borate
mono(5-[2-(3-cyclohexen-1-yl)vinyl]-2-cyclohexen-1-yl) borate
mono(1-[2-(3-cyclohexen-1-yl)vinyl]-3-cyclohexen-1-yl) borate
bis(6-[2-(3-cyclohexen-1-yl)vinyl]-2-cyclohexen-1-yl) borate
mono(5-[2-(3-cyclohexen-1-yl)vinyl]-2-cyclohexen-1-yl)
mono(1-[2-(3-cyclohexen-1-yl)vinyl]-3-cyclohexen-1-yl) borate
mono(5-[2-(3-cyclohexen-1-yl)vinyl]-2-cyclohexen-1-yl)
mono(1-[2-(3-cyclohexen-1-yl)vinyl]-3-cyclohexen-1-yl)
mono(6-[2-(3-cyclohexen-1-yl)vinyl]-2-cyclohexen-1-yl) borate
mono(6-[2-(3-cyclohexen-1-yl)vinyl]-2-cyclohexen-1-yl)
bis(5-[2-(3-cyclohexen-1-yl)vinyl]-2-cyclohexen-1-yl) borate
mono(1-[2-(2-methyl-3-cyclohexen-1-yl)vinyl]-3-cyclohexen-1-yl) borate
bis(6-[2-(4-ethyl-3-cyclohexen-1-yl)vinyl]-3-ethyl-2-cyclohexen-1-yl) borate
tris(5-[2-(2-ethyl-3,4-dimethyl-3-cyclohexen-1-yl)vinyl]-2,3-dimethyl-4-ethyl-2-cyclohexen-1-yl) borate The borate esters obtained in the oxidation step are readily hydrolyzed to the corresponding unsaturated alcohols by heating with water, preferably containing a small amount of a mineral acid, such as hydrochloric acid or sulfuric acid, to catalyze the hydrolysis. Typical hydrolysis conditions include heating at temperatures of about 50–110 C. for periods of time between about 10 minutes and about 2 hours. After separation of the aqueous and organic phases, the unsaturated alcohols are conveniently isolated from the organic phase by distillation or other suitable separation process. The unsaturated alcohols, before or after purification, are readily hydrogenated by conventional techniques, e.g., over a palladium or platinum catalyst, to give the corresponding saturated alcohols.

Specific examples of mono-ols produced in the practice of this invention are as follows:

1-(3-cyclohexen-1-yl)-2-(1-hydroxy-3-cyclohexen-1-yl) ethylene
1-(3-cyclohexen-1-yl)-2-(2-hydroxy-3-cyclohexen-1-yl) ethylene
1-(3-cyclohexen-1-yl)-2-(5-hydroxy-3-cyclohexen-1-yl) ethylene
1-(1-methyl-3-cyclohexen-1-yl)-2-(1-methyl-5-hydroxy-3-cyclohexen-1-yl)ethylene
1-(2-methyl-3-cyclohexen-1-yl)-2-(2-methyl-2-hydroxy-3-cyclohexen-1-yl)ethylene
1-(3-ethyl-3-cyclohexen-1-yl)-2-(3-ethyl-1-hydroxy-3-cyclohexen-1-yl)ethylene
1-(4-methyl-3-cyclohexen-1-yl)-2-(4-methyl-2-hydroxy-3-cyclohexen-1-yl)ethylene
1-(5-ethyl-3-cyclohexen-1-yl)-2-(5-ethyl-5-hydroxy-3-cyclohexen-1-yl)ethylene
1-(6,6-dimethyl-3-cyclohexen-1-yl)-2-(6,6-dimethyl-2-hydroxy-3-cyclohexen-1-yl)ethylene
3-(3-cyclohexen-1-yl)-4-(5-hydroxy-3-cyclohexen-1-yl)-3-hexene
1-(2,6-dimethyl-3-cyclohexen-1-yl)-2-(2,6-dimethyl-2-hydroxy-3-cyclohexen-1-yl)ethylene
2-(3-methyl-3-cyclohexen-1-yl)-3-(3-methyl-1-hydroxy-3-cyclohexen-1-yl)-2-butene
1(1,3-dimethyl-3-cyclohexen-1-yl)-2-(1,3-dimethyl-5-hydroxy-3-cyclohexen-1-yl)ethylene
2-(4-methyl-3-cyclohexen-1-yl)-3-(4-methyl-1-hydroxy-3-cyclohexen-1-yl)-2-butene
1-(1,4-dimethyl-3-cyclohexen-1-yl)-2-(1,4-dimethyl-2-hydroxy-3-cyclohexen-1-yl)ethylene
1-(5,6-dimethyl-3-cyclohexen-1-yl)-2-(5,6-dimethyl-1-hydroxy-3-cyclohexen-1-yl)ethylene
2-(1,3,4-trimethyl-3-cyclohexen-1-yl)-3-(1,3,4-trimethyl-5-hydroxy-3-cyclohexen-1-yl)-2-butene
1-(2,5,6-trimethyl-3-cyclohexen-1-yl)-2-(2,5,6-trimethyl-1-hydroxy-3-cyclohexen-1-yl)ethylene
1-(2,6-diethyl-3-cyclohexen-1-yl)-2-(2,6-diethyl-2-hydroxy-3-cyclohexen-1-yl)ethylene
3-(4-ethyl-3-cyclohexen-1-yl)-4-(4-ethyl-5-hydroxy-3-cyclohexen-1-yl)-3-hexene
1(2-methyl-6-ethyl-3-cyclohexen-1-yl)-2-(3-methyl-1-hydroxy-3-cyclohexen-1-yl)ethylene
1-(3-cyclohexen-1-yl)-2-(2-methyl-2-hydroxy-3-cyclohexen-1-yl)ethylene Unsaturated diols which can be produced by the process of this invention have the formula

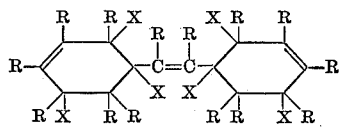

where R is at least one member selected from the group consisting of hydrogen and methyl and ethyl radicals and X is a member selected from the group consisting of R and hydroxy, two and only two of said X members being hydroxy, and wherein the total number of carbon atoms in all of said R and X members is preferably not greater than 8.

Specific examples are:

1,2-bis(1-hydroxy-3-cyclohexen-1-yl)ethylene
1,2-bis(2-hydroxy-3-cyclohexen-1-yl)ethylene
1,2-bis(5-hydroxy-3-cyclohexen-1-yl)ethylene
1-(1-hydroxy-3-cyclohexen-1-yl)-2-(4-methyl-2-hydroxy-3-cyclohexen-1-yl)ethylene
1-(2,5-diethyl-2-hydroxy-3-cyclohexen-1-yl)-2-(2,5-diethyl-5-hydroxy-3-cyclohexen-1-yl)ethylene The unsaturated alcohols of this invention can be used in a number of applications which involve one or more of the olefinic double bonds and/or hydroxyl groups. For example, acrylic acid or methacrylic acid can be esterified with the unsaturated alcohols, and the esters thus produced can be polymerized to yield polymers having a greater number of cross linkages than occur in the usual polyacrylate or polymethacrylate resins. Additionally, the esterified unsaturated alcohols can be used as plasticizers. The saturated alcohols of this invention are especially useful as stabilizers for cellulose ester compositions, the saturated alcohols imparting to these compositions improved resistance to ultraviolet rays and outdoor exposure.

The following example is offered to illustrate the invention and it is not intended to limit the scope thereof.

EXAMPLE

Into a mixture of 181.3 g. of trans-1,2-bis(3-cyclohexen-1-yl)ethylene and 10.0 of boron oxide at 140 C. was passed 545 l. of a gaseous stream consisting of nitrogen containing 3.4 mole percent of oxygen for 3¼ hours. The resulting mixture was refluxed with a mixture of 500 ml. of water and 5 ml. of concentrated hydrochloric acid for 1½ hours. The organic phase was separated and distilled, whereby 98.7 g. of unreacted triolefin was recovered. The residue was poured into 1200 ml. of cyclohexane, and the resulting mixture was filtered to remove a small amount (4 g.) of polymeric material. After removal of cyclohexane from the filtrate, the residual liquid was distilled to give an additional 11.9 g. of unreacted triolefin. The residual liquid, comprising oxygenated triolefin products, weighed 54.8 g. (Sample A).

A 44.0 g. portion of this residual liquid (A) comprising oxygenated triolefin products was distilled to give 18.0 g. of a fraction boiling at 80–140 C./0.05 mm. (B) and 7.0 g. of a second fraction boiling at 140–155 C./0.05 mm. (C). A large amount of polymeric material remained as residue. The fraction (B) boiling at 80–140 C./0.05 mm. was chromatographed over alumina through the use of benzene and methanol to give a benzene-eluted fraction weighing 6.0 g. (D) and a methanol-eluted fraction (E). Fraction (E) was distilled to give 7.0 g. of trienols boiling at 98–108 C./0.05 mm. (F) and 4.2 g. of oxygenated products boiling at 108–140 C./0.05 mm., presumably a mixture of trienols and trienediols. Infrared analysis of the fraction (F), trienols boiling at 98–108 C./0.05 mm., showed the presence of olefinic unsaturation and hydroxyl groups and the total absence of carbonyl groups. Nuclear magnetic resonance analysis of a sample of trienols, from another experiment but having the same boiling point and infrared spectrum as the above trienol mixture, gave results consistent with those to be expected for a mixture of hydroxy substituted 1,2-bis-(3-cyclohexen-1-yl)ethylenes having a single hydroxyl group in a position allylic to an olefinic double bond. These results are summarized in Table I.

TABLE I

| | Proton Distribution* | | | |
|---|---|---|---|---|
| | $H^a$ and $H^b$ | $H^c$ | $H^d$ | $H^e$ |
| Found | 5.8 | 1.0 | 1.0 | 12.2 |
| Theory | 6 | 1 | 1 | 12 |

*Designations for proton type are as follows:
$H^a$—cyclic non-terminal olefinic protons. $H^b$—non-cyclic non-terminal olefinic protons. $H^c$—hydroxyl protons. $H^d$—protons on carbons attached hydroxyl groups. $H^e$—all other protons.

These types are illustrated in the following example:

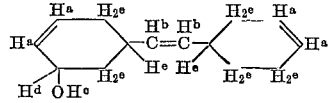

In the calculations of proton distribution, correction was made for aromatic protons which were present.

The molecular weight, by osmometry, of the above sample analyzed by nuclear magnetic resonance, was 209, compared with a calculated molecular weight of 194 for a mixture of hydroxy substituted 1,2-bis(3-cyclohexen-1-yl)ethylenes having a single hydroxyl group in the molecule. The hydroxyl number was observed to be 292, compared with a calculated value of 289. Gas chromatographic analysis, using 6 percent Carbowax on Teflon as column packing, indicated the presence of at least five components, as least four of these components being present as minor constituents.

A 10.0 g. portion of Sample (A) was dissolved in 100 ml. of absolute ethanol and hydrogenated over a palladium-on-charcoal catalyst. After removal of the catalyst and solvent, the hydrogenated product was chromatographed over alumina through the use of benzene and method to separate hydroxylated products from any hydrocarbon material present. The fraction eluted with methanol was distilled to given 1.7 g. of a fraction boiling at 95–110° C. / 0.06 mm. (G) and 1.0 g. of a second fraction boiling at 110–135 C./0.06 mm. (H). The residue weighed 2.0 g. Nuclear magnetic resonance analysis of the fraction (G) boiling at 95–110 C./0.06 mm., showed the ratio of protons in CHOH groups to all other protons to be 1.9:24.1, agreeing well with the calculated ratio of 2:24 for a monohydroxylated 1,2-dicyclohexylethane. This analysis also showed the substantial absence of unsaturation. Infrared analysis showed the presence of hydroxyl groups and the essential absence of carbonyl groups and olefinic unsaturation. Gas chromatographic analysis indicated the presence of at least four components, at least three of these components being present as minor constituents. The fraction (H), boiling at 110–135 C./0.06 mm., which partially crystallized on standing, was found by infrared analysis to have a higher hydroxyl content than did the preceding fraction, and was essentially free of carbonyl group. Gas chomatographic analysis indicated the presence of all of the components observed above in the lower-boiling fraction together with one major component, a diol, which eluted at a higher temperature and comprised approximately 50 weight percent of the fraction.

Thus, oxidation of trans-1,2-bis(3-cyclohexen-1-yl) ethylene with molecular oxygen in the presence of boron oxide gave a mixture of esters which were hydrolyzed to obtain oxygenated products comprising hydroxy substituted 1,2-bis(3-cyclohexen-1-yl)ethylenes having a hydroxyl group in at least one position allylic to an olefinic double bond. Hydrogenation of these oxygenated unsaturated products gave the corresponding saturated alcohols.

Suitable modifications and variations may be made in

It is claimed:
1. An alcohol characterized by one of the following formulas; mono-ols having the formulas

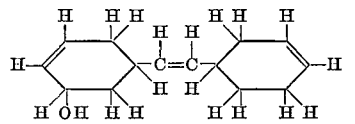

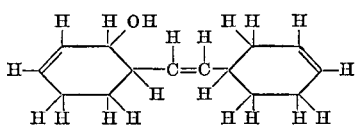

and

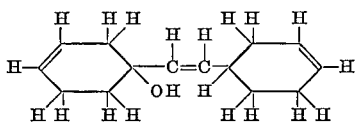

and having the formula

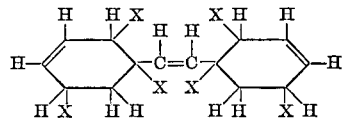

where X is a member selected from the group consisting of H and hydroxy, two and only two of said X members being hydroxy.

2. An alcohol according to claim 1 which is 1-(3-cyclohexen-1-yl)-2-(1-hydroxy-3-cyclohexen-1-yl)ethylene.
3. An alcohol according to claim 1 which is 1-(3-cyclohexen-1-yl)-2-(2-hydroxy-3-cyclohexen-1-yl)ethylene.
4. An alcohol according to claim 1 which is 1,2-bis(1-hydroxy-3-cyclohexen-1-yl)ethylene.
5. An alcohol according to claim 1 which is 1,2-bis(2-hydroxy-3-cyclohexen-1-yl)ethylene.
6. An alcohol according to claim 1 which is 1-(3-cyclohexen-1-yl)-2-(5-hydroxy-3-cyclohexen-1-yl)ethylene.

References Cited

UNITED STATES PATENTS

| 2,392,864 | 1/1946 | Schoeller et al. | 260—617 |
|---|---|---|---|
| 3,238,238 | 3/1966 | McNamara et al. | |
| 3,301,887 | 1/1967 | Kirshenbaum et al. | |

OTHER REFERENCES

Ghera et al., "J. Am. Chem. Soc.," vol. 84, pp. 2953–61 (1962).

LEON ZITVER, Primary Examiner

J. E. EVANS, Assistant Examiner

U.S. Cl. X.R.

260—13, 89.5, 462, 486, 631

UNITED STATES PATENT OFFICE

CERTIFICATE OF CORRECTION

Patent No. 3,527,815　　　　　Hans D. Holtz　　　　　Dated September 8, 1970

It is certified that error appears in the above-identified patent and that said Letters Patent are hereby corrected as shown below:

Column 7, line 8, "formulas;" should read -- formulas: --; line 26, "and having the formula" should read -- and diols having the formula --.

SIGNED AND
SEALED
JAN 12 1971

(SEAL)
Attest:

Edward M. Fletcher, Jr.
Attesting Officer

WILLIAM E. SCHUYLER, JR.
Commissioner of Patents